United States Patent
Wang et al.

(10) Patent No.: US 9,235,904 B1
(45) Date of Patent: Jan. 12, 2016

(54) OBJECT DETECTION WITH REGIONLETS RE-LOCALIZATION

(71) Applicant: NEC Laboratories America, Inc., Princeton, NJ (US)

(72) Inventors: Xiaoyu Wang, Sunnyvale, CA (US); Yuanqing Lin, Sunnyvale, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/716,435

(22) Filed: May 19, 2015

Related U.S. Application Data (60) Provisional application No. 62/014,787, filed on Jun. 20, 2014.

(51) Int. Cl.
| | |
|---|---|
| *G06K 9/00* | (2006.01) |
| *G06T 7/00* | (2006.01) |
| *G01B 11/14* | (2006.01) |
| *G06K 9/62* | (2006.01) |

(52) U.S. Cl.
CPC .............. *G06T 7/0081* (2013.01); *G01B 11/14* (2013.01); *G06K 9/6256* (2013.01); *G06T 7/0046* (2013.01); *G06T 7/0089* (2013.01); *G06T 2207/20081* (2013.01); *G06T 2207/20141* (2013.01)

(58) Field of Classification Search
CPC ... G06T 7/0081; G06T 7/0046; G06T 7/0089; G06T 2207/20081; G06T 2207/20141; G01B 11/14; G06K 9/6256
See application file for complete search history.

(56) References Cited

U.S. PATENT DOCUMENTS

| | | | |
|---|---|---|---|
| 2004/0100556 A1* | 5/2004 | Stromme | H04N 5/272 348/157 |
| 2006/0188131 A1* | 8/2006 | Zhang | G06T 7/0044 382/103 |
| 2011/0219267 A1* | 9/2011 | Migliasso | G06F 11/008 714/37 |

* cited by examiner

*Primary Examiner* — Brian Le
(74) *Attorney, Agent, or Firm* — Joseph Kolodka (57) ABSTRACT

An object detector includes a bottom-up object hypotheses generation unit; a top-down object search with supervised descent unit; and an object re-localization unit with a localization model.

17 Claims, 5 Drawing Sheets

$$\min \frac{\|V\|}{2} + C \sum_{m=1}^{M}(\Delta L_m - V^T R_m)^2$$

FIG. 1B $$\min \frac{\|V\|}{2} + C \sum_{m=1}^{M} (\triangle L_m - V^T R_m)^2$$

FIG. 1C

FIG. 2A (a) A testing image
FIG. 2B (b) Coarse detections
FIG. 2C (c) Supervised descent search
FIG. 2D (d) Regionlets Re-localization

OBJECT DETECTION WITH REGIONLETS RE-LOCALIZATION

This application claims priority to Provisional Application Ser. No. 62/014,787 filed Jun. 20, 2014, the content of which is incorporated by reference.

The present invention relates to object detection systems and methods.

BACKGROUND

Current object detection algorithms are focused on robustly detects the target object. Even the detection window is not precisely overlapping the object, the object detector can still response with a high detection score. It contradicts with some applications in which want as accurate localization as possible.

Standard sliding window based object detection requires dense classifier evaluation on densely sampled locations in scale space in order to achieve an accurate localization. To avoid such dense evaluation, selective search based algorithms only evaluate the classifier on a small subset of object proposals. Notwithstanding the demonstrated success, object proposals do not guarantee perfect overlap with the object, leading to a suboptimal detection accuracy.

SUMMARY

In one aspect, an object detector includes a bottom-up object hypotheses generation unit; a top-down object search with supervised descent unit; and an object re-localization unit with a localization model.

In another aspect, a method takes advantage of the rich spatial information encoded in the Regionlets object detection model for location prediction. The method transfers the Regionlets feature extracted from the Regionlets model to a high dimensional sparse binary vector. This binary vector implicitly encodes thousands of object locations. Then the method learns a regression model based on the binary vector to predict the actual object location.

Implementations of the above aspects may include one or more of the following. The system first relaxes the dense sampling of the scale space with coarse object proposals generated from bottom-up segmentations. Based on detection results on these proposals, the system conducts a top-down search to more precisely localize the object using supervised descent. This two-stage detection strategy, dubbed location relaxation, is able to localize the object in the continuous parameter space. Furthermore, there is a conflict between accurate object detection and robust object detection. That is because the achievement of the later requires the accommodation of inaccurate and perturbed object locations in the training phase. To address this conflict, the system and method leverage the rich spatial information learned from the Regionlets detection framework to determine where the object is precisely localized. Our proposed approaches are extensively validated on the PASCAL VOC 2007 dataset and a self-collected large scale car dataset. Our method boosts the mean average precision of the current state-of-the-art (41.7%) to 44.1% on PASCAL VOC 2007 dataset. To our best knowledge, it is the best performance reported without using outside data.

DESCRIPTION

An object may appear in any locations and scales in an image defined by the continuous parameter space spanned by (x, y, s, a), where (x, y) is the object center point, and s and a are the scale and aspect ratio of the object. In particular, different aspect ratios generally correspond to different viewpoints, leaving a difficult open question for robust object detection.

Figure 1A:
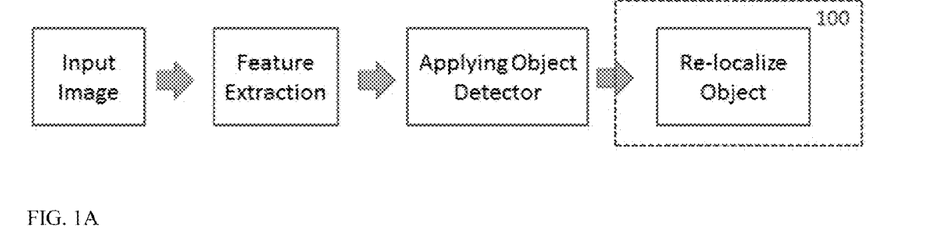
FIGS. 1A-1C show an exemplary process to perform accurate object detection with Location Relaxation and Regionlets Re-localization.
Figure 1B:
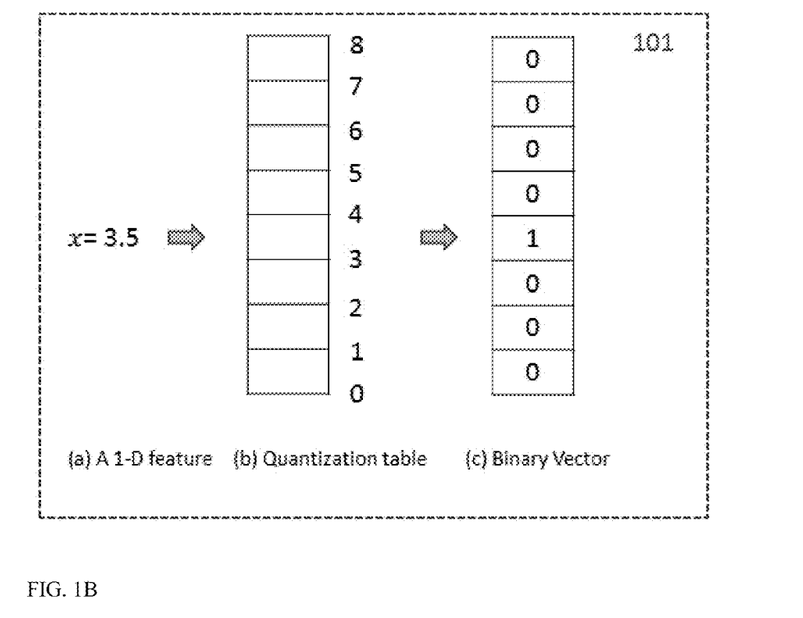
Figure 1C:
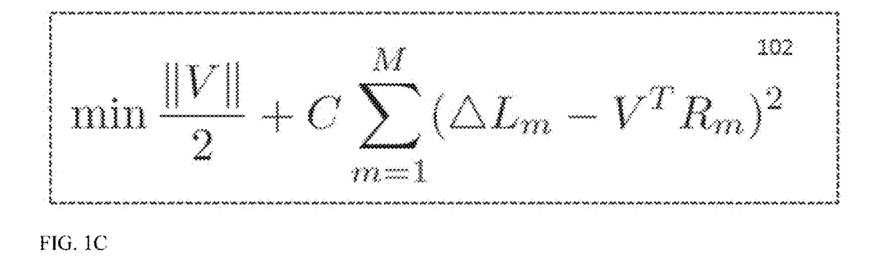

FIG. 1 shows an exemplary process for detecting objects. The process includes receiving an input image, extracting features therefrom, applying an object detector, and re-localizing the object (100).

Given a testing image, the object detection framework extracts features from the image, and then applies the learned object detector to each possible locations to detect the object. A binary decision, i.e., whether the location presents an object, is made based on scores provided by the object detector. In addition to traditional approaches, a location regression step improves the localization of the object. The approach has two steps shown in FIGS. 2 and 3, respectively.

Figure 3:
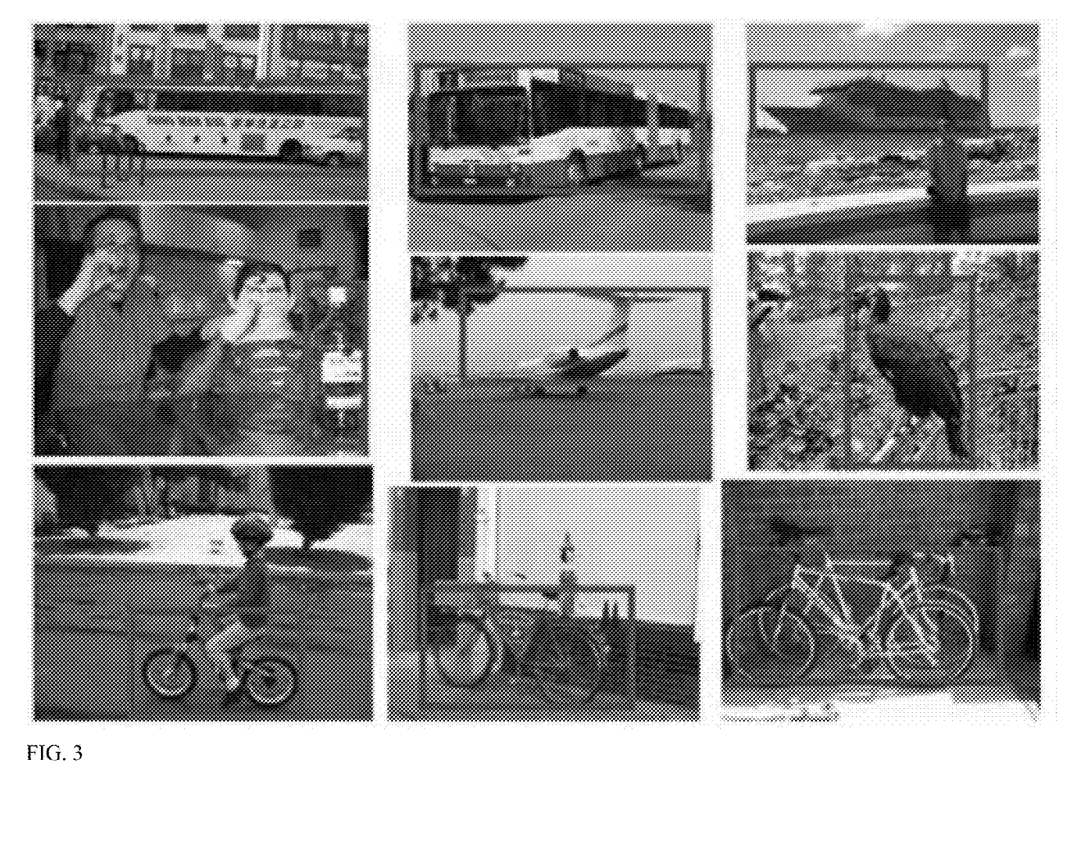
FIG. 3 shows a sample detection results on the PASCAL VOC 2007 dataset.
Figure 4:
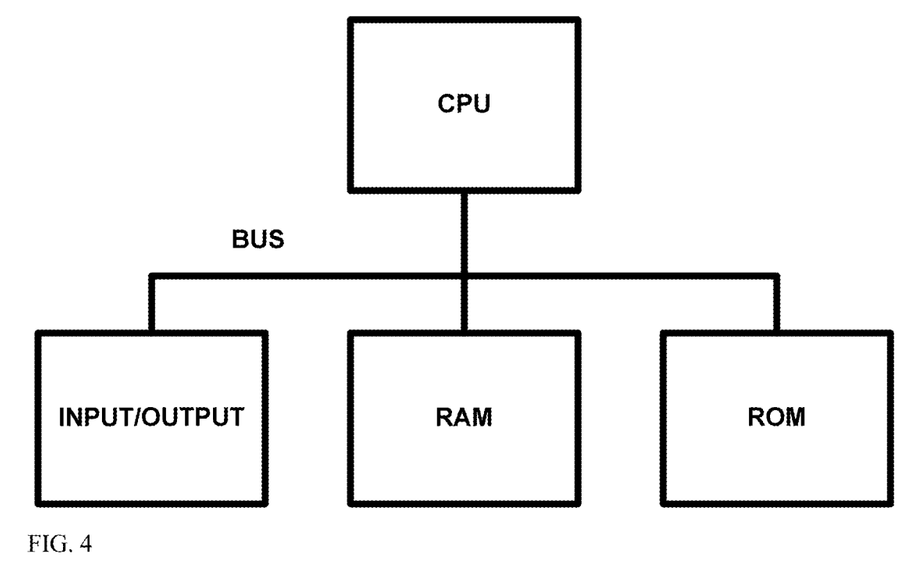
FIG. 4 shows an exemplary computer system to perform accurate object detection with Location Relaxation and Regionlets Re-localization.

In FIG. 2, the system and method transfer the 1-D feature extracted from Regionlets into a 8 dimensional binary vector as shown in 101. These features have rich spatial information which helps to localize the object. We concatenate the binary vectors obtained from all Regionlets features for regression training In FIG. 3, the system and method use the least square learning to learn the coefficients for location regression based on the binary vector as shown in 102.

$$\min \frac{\|V\|}{2} + C \sum_{m=1}^{M} (\Delta L_m - V^T R_m)^2 \qquad 102$$

The detection framework is capable of precisely searching for the object in a full parameter space with favorable efficiency. To achieve this goal, the system and method first relax dense sampling of the object location and scale, dubbed the name location relaxation, and only evaluate the detector at a much coarser set of locations and scales. For coarse detection windows which have relatively high response, the system and method apply supervised descent search to find potential object hypothesis by simultaneously optimizing their center point, scale, and aspect ratio. The resulting detections are much more improved with supervised descent search but still not sufficient in terms of accurate localization. For this the system and method use Regionlets Re-localization, which is naturally built based on the quantized Regionlets features, to directly predict the true object location based on results from supervised descent search.

Figure 2A:
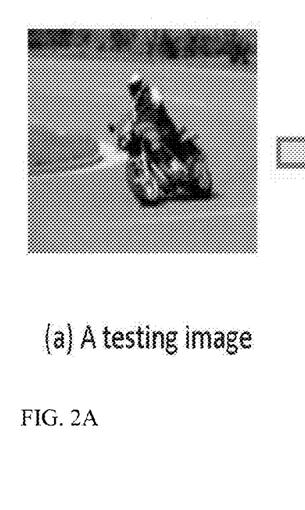
FIGS. 2A-2D show an illustration of an object detection frame work.
Figure 2B:
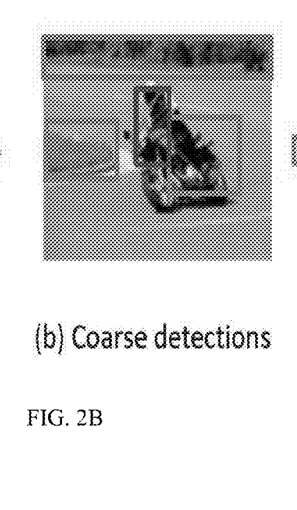
Figure 2C:
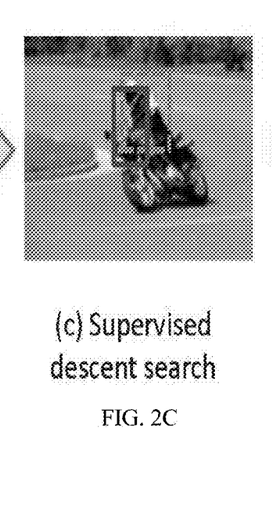
Figure 2D:
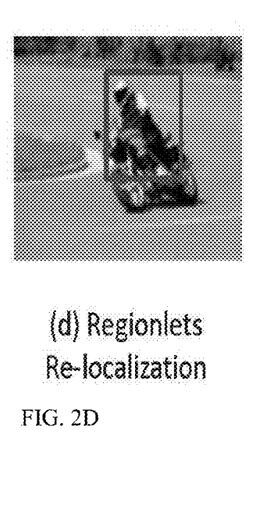

By applying an object detector to bottom-up object proposals, the system and method obtain coarse detections, i.e., the bounding boxes shown in FIG. 2(b). Among them, the red box is relatively confident detection compared to others. Through the supervised descent search starting from the red bounding box, a better detection is obtained as the dash box in FIG. 2 (c). Finally the system and method apply Regionlets Re-localization to determine the object location as shown in FIG. 2 (d). We show some sample detection results on the PASCAL VOC 2007 dataset in FIG. 3.

The system has three aspects. Firstly, coarse detection plus supervised descent search in a fully parameterized location space for generic object detection shows promising performance. Secondly, a novel Regionlets Re-localization method complements the suboptimal object localization performance given by object detectors. Finally, our detection framework achieves the best performance on the PASCAL VOC 2007 dataset without using any outside data. It also demonstrates superior performance on our self-collected car dataset.

Our object detection framework is composed of three key components: bottom-up object hypotheses generation, top-down object search with supervised descent and object re-localization with a localization model.

There are several alternatives to obtain object hypotheses. For example, through the objectness measurement, the saliency analysis or their combinations, or using segmentation cues. Because our top-down search algorithm is applied locally, the system and method expect the bottom-up object hypotheses to split the object location space evenly, to avoid the search algorithm converging to the same local minimum. To this end, the system and method employ low-level segmentation to propose the object hypotheses. The superpixel segmentation merges similar pixels locally into disjoint sets which perfectly matches our need. However, over-segments only provide small object candidates. To obtain object hypotheses for large objects, the over segmented superpixels are gradually merged to produce larger candidates.

The detection with location relaxation takes coarse detection results from a detector applied on the bottom up object proposals. Then it searches the object location guided by discriminatively learned descent model inspired by Xiong and De la Torre. The learned supervised descent model is used to predict the next more accurate object location to explore based on observations from the current location. Although our method is applicable with any black box object detector, the system and method use the Regionlets detector due to its outstanding performance and flexibility to detect objects in any viewpoints.

All the detection results, including the original coarse detections as well as detections generated by supervised descent search, are fed to our Regionlets Re-localization process to more accurately locate the target objects.

To complement our top-down searching strategy, the system and method employ a segmentation based bottom-up scheme to generate our initial set of candidate searching locations. We start with over-segments (i.e., superpixels) of an image and then hierarchically group these small regions to generate object hypotheses. We generate superpixel segments. A segmented region $r_i$ is described by several characteristics, i.e., the size of the region (total number of pixels), color histograms, and the texture information (gradient orientation histograms). Four neighbor region similarities are defined based on these characteristics as shown in the following equations:

$$S_c(r_i, r_j) = \sum_{k=1}^{n} \min(c_i^k, c_j^k), \quad (1)$$

$$S_s(r_i, r_j) = 1 - \frac{sz(r_i) + sz(r_j)}{sz(im)} \quad (2)$$

$$S_t(r_i, r_j) = \sum_{k=1}^{n} \min(t_i^k, t_j^k), \quad (3)$$

$$S_f(r_i, r_j) = 1 - \frac{sz(bb_{ij}) - sz(r_i) - sz(r_j)}{sz(im)}. \quad (4)$$

where $c_i^k$ is the k th dimension of the color histogram, $sz(r_i)$ is the number of pixels in image region $r_i$, im stands for the whole image, $t_i^k$ is the k th dimension of the texture histogram, $bb_{ij}$ is the rectangular region which tightly bound region $r_i$ and $r_j$. $S_c$, $S_s$ and $S_t$ are the color similarity, size similarity, texture similarities, respectively. $S_f$ measures how the combined two regions will occupy the rectangular bounding box which tightly bounds them. The similarity of two adjacent regions can be determined by any combination of the four similarities.

The two regions with the highest similarity w.r.t the similarity measurement are merged first and this greedy process is repeated following an agglomerative style clustering scheme. Each merging step produces a bounding box which bounds the merged two regions. In principle, the system and method want regions from the same object to be merged together. Each low level cue contributes from its aspect. For example, the color similarity measures the color intensity correlation between neighbor regions which encourage regions similar in color to be merged together. The size similarity encourages small regions to merge first. The fill similarity encourages the bounding box to tightly bound the merged region. The texture similarity measures the similarity of appearance in gradient, which is complementary to color similarity. The usage of similarity measures and segmentation parameters are detailed in the experiment section.

Once the coarse object hypotheses are obtained, the system and method apply an object detector to determine relatively confident detections. The top-down supervised descent search is only applied to these confident detections.

Supervised descent is a general approach to optimize an objective function which is neither analytically differentiable nor practical to be numerically approximated. It is very suitable for vision problems when visual feature is involved in optimizing the objective function, because most visual features such as SIFT, HOG, and LBP histogram are not differentiable with respect to locations. Instead of computing the descent direction from the gradient, supervised descent uses a large number of examples to train a regression model to predict the descent direction. The training process requires features, which serves as the regressor, to be a fixed length vector, while bottom up segmentations naturally produces arbitrary size proposals. To deal with this issue, the system and method normalize the bounding boxes to a fixed size. In the following, the system and method explain how the supervised descent is adopted to find objects in a full parameter space.

Given an initial object hypothesis location $o_0=[x_0, y_0, s_0, a_0]^T$, which may not accurately bound the object, our objective is to use supervised descent to greedily adjust the bounding box by a local movement $\Delta o=[\Delta x, \Delta y, \Delta s, \Delta a]^T$, leading to a more accurate localization of the object. The goal of the supervised descent training process is hence to learn a sequence of K models to predict the optimal descent direction of the bounding box for each step of the supervised descent, where the needed supervised descent step K is also automatically identified from the training process.

More specifically, denote $\Phi(o_{k-1})$ to be the n dimensional feature vector extracted from the bounding box defined by $o_{k-1}$ in the k−1 step of the supervised descent process, the system and method learn an n×4 linear projection matrix $R_{k-1} = [r_{k-1}^x, r_{k-1}^y, r_{k-1}^s, r_{k-1}^a]^T$ and a four dimensional bias vector $b_{k-1} = [b_{k-1}^x, b_{k-1}^y, b_{k-1}^s, b_{k-1}^a]^T$ so that the bounding box movement can be predicted as $\Delta o_k^i = R_{k-1}^T \Phi(o_{k-1}) b_{k-1}$ based on the location from the k−1 step. $\Phi(\cdot)$ indicates the feature extracted which is HOG and LBP histogram in our experiments.

We first explain the training process for the first supervised descent model, followed by details to train models sequentially after. Given a set of labeled ground truth object locations $\{o_*^i = (x_*^i, y_*^i, s_*^i, a_*^i)\}$, the system and method construct the starting locations $\{o_0^i = (x_0^i, y_0^i, s_0^i, a_0^i)\}$ of the object by applying a random perturbation from the ground truth but assure that they are overlapped. The training of the projection matrix $R_0$ and the bias $b_0$ is to solve the following optimization problem:

$$\arg\min_{R_0, b_0} \sum_i \|\Delta o_{0*}^i - \Delta o_0^i\|^2, \quad (5)$$

where $\Delta o_{0*}^i = o_*^i - o_0^i$ is the true movement and $\Delta o_0^i = R_0^T \Phi(o_0^i) + b_0$ is the predicted displacements of the state vector. The optimal $R_0$ and $b_0$ are computed in a closed-form by a linear least square method.

The subsequent $R_k$ and $b_k$ for k=1, 2, . . . , can be learned iteratively. At each iteration, the system and method update the new locations determined by the previous model $R_{k-1}$ and $b_{k-1}$, $$o_k^i = o_{k-1}^i + R_{k-1}^T \Phi(o_{k-1}^i) + b_{k-1}. \quad (6)$$

By updating $\Delta o_{k*}^i = o_*^i - o_k^i$ and $\Delta o_k^i = R_k^T \Phi(o_{k-1}^i) + b_{k-1}$ the optimal $R_k$ and $b_k$ can be learned from a new linear regression problem by minimizing $$\arg\min_{R_k, b_k} \sum_i \|\Delta o_{k*}^i - \Delta o_k^i\|^2. \quad (7)$$

The error empirically decreases as more iterations are added. In our experiments, this training of supervised descent models often converged in 20-30 steps.

Given a testing image, the system and method firstly apply the cascade regionlets detector [23] to the coarse bottom-up object candidates. Object hypotheses which produces high detection scores are fed to the iterative supervised descent search process to perform local search. New locations output by supervised descent search are re-evaluated by the object detector to obtain the detection score. By ranking all the detection scores from searched locations, the system and method keep the most confident detections.

The supervised descent search introduced in the previous subsection significantly improve the detection rate by scanning more predicted object candidates. In this section, the system and method assume the object has already been detected, but with non-perfect localization. To further improve the object detection system, the system and method train a model specific for object localization taking advantage of features extracted from the Regionlets detection model.

The Regionlets detector is composed of thousands of weak classifiers learned with RealBoost. These weak classifiers are formed as several cascades for early rejection, yielding fast object detection. The cascade structure is not related to our re-localization approach and would not be included in the following presentation without any misunderstanding. The input of each weak classifier in the Regionlets model is a 1-D feature extracted from a rectangular region in the detection window. In the training process, these 1-D features are greedily chosen to minimize the logistic loss over all training samples, which is based on classification errors.

Not only does the Regionlets training process greedily select discriminative visual appearances, but also it determines the spatial regions to extract the 1-D feature. Thus the resulting weak features extracted from regionlets implicitly encode thousands of spatial locations, which could be used to further predict the precise location of an object. It is worth noting that the detector learning only targets on minimizing the classification error which does not necessarily guarantee that the localization error is also minimized at the same time.

To leverage the rich spatial information encoded in the Regionlets model, the system and method let each Regionlet vote the object's position. Given the object location (l, t, r, b) detected by the object detector ((l, t, r, b) represents the object's left, top, right and bottom coordinates, respectively), the problem is equivalent to predict the localization error ($\Delta l_n$, $\Delta l_t$, $\Delta l_r$, $\Delta l_b$) of the current detection so that the true object location is computed as:

$$l^* = l + w\Delta l_n, t^* = t + h\Delta t_n,$$

$$r^* = r + w\Delta r_n, b^* = b + h\Delta b_n. \quad (8)$$

Here (l*, t*, r*, b*) is the ground truth object location. (l, t, r, b) is the bounding box detected with the Regionlets model. w=r−l+1, h=b−t+1 are the detected bounding box width and height respectively. ($\Delta l_n$, $\Delta t_n$, $\Delta r_n$, $\Delta b_n$) are the relative localization error between the ground truth and the current detection. It is normalized by the width and height of the detected objects. Detections from Regionlets model have various sizes, the system and method observe that normalizing displacement errors is critical to stabilize the training and prediction.

Training the localization model is to learn a vector V, so that the system and method can predict the localization error: $\Delta L = V^T R$, where $\Delta L$ is either $\Delta l_n$, $\Delta t_n$, $\Delta r_n$, or $\Delta b_n$, R is the feature extracted for from regionlets. We minimize the squared localization error in the model training phase. More specifically, the system and method solve a support vector regression problem for each of the four coordinates respectively:

$$\min_V \left\{ \frac{\|V\|}{2} + C \sum_{m=1}^M \max(0, |\Delta L_m - V^T R_m| - \varepsilon)^2 \right\}, \quad (9)$$

where V is the coefficient vector to be learned, $\Delta L_m$ is the normalized localization error of training sample m, $R_m$ is the feature extracted from all the Regionlets in the object detection model for the m th sample as explained in the following, M is the total number of training examples. The first term in the Equation (9) is the regularization term, while C is a trade-off factor between the regularization and the sum of squared error, $\varepsilon$ is the tolerance factor. The problem can be effectively solved using the publicly available liblinear package.

The feature R is extracted from the discriminatively learned Regionlets detection model. However, directly applying Regionlets features produces poor performance. Based on the weak classifier learned on each Regionlets feature, the system and method transfer the 1-D Regionlet feature into a sparse binary vector. Each Regionlets weak classifier is a piece-wise linear function implemented using a lookup table:

$$h_i = \sum_{j=1}^{8} w_{i,j} \delta(Q(f_i) - j), \quad (10)$$

where f is the 1-D feature extracted from a group of regionlets, $Q(f_i)$ quantize the feature $f_i$ into an integer from 1 to 8. $\delta(x)=1$ when x=0 otherwise 0. $\{w_{i,j}\}_{j=1}^{8}$ is the classifier weights learned in the boosting training process. We transfer $Q(f_i)$ into an 8-dimensional binary vector r, where the j th dimension is computed as $r(j)=1(Q(f_i)=j)$, and $1(\cdot)$ is the indicator function. Apparently, there is one and only one nonzero dimension in r. Note that the Regionlets object detector is a combination of N weak classifiers:

$$H = \sum_{i=1}^{N} h_i. \quad (11)$$

Thus by concatenating these binary vectors from all weak classifiers, the detection model naturally produces 8N dimensional sparse vectors, denoted as $R=(r_1^T, r_2^T, \ldots, r_N^T)^T$. It serves as the feature vector $R_m$ in Equation (9). Intuitively, each Regionlets feature $f_i$ has 8 options to vote for the actual object location depending on the binarized feature vector $r_i$. Learning the weight vector V in Equation (9) is to jointly determine the votes (regression coefficients) in 8 different scenarios for all Regionlets features.

The sparse binary features extracted from regionlets are very high dimensional. We observed significant over-fitting problem if there are not enough training samples. To avoid over-fitting during training, the system and method randomly sample 80 k bounding boxes around ground truth objects to train the localization model.

The supervised descent search is designed to search more object candidates in a principled way to increase the detection rate, and a following discriminative visual model (Regionlets detector) is mandatory to determine the detection scores of new locations. Regionlets Re-localization is only used to predict the accurate object location. There is no detector followed to evaluate the new location as in the supervised search. Thus it adjusts the detection to a more precise location without changing the detection score. In contrast, using the object detector to re-evaluate the detection score decreases the performance. Because the newly predicted location usually gives lower detection score which causes the predicted location being eliminated in the post non-max suppression process. To summarize, the role of supervised descent search is to find objects based on detections with coarse locations. Regionlets Re-localization is conducted on fine detections from supervised descent search. It aims at further improvement in accurate localization based on reasonable good localizations from supervised descent search. Leaving out any of these two schemes would significantly hurt the detection performance according to our observation.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An object detector, comprising:
a computer to perform the following units:
a bottom-up object hypotheses generation unit;
a top-down object search with supervised descent unit;
an object re-localization unit with a localization model; and
an object relocalization unit with a localization module that determines:

$$\min_V \left\{ \frac{\|V\|}{2} + C \sum_{m=1}^{M} \max(0, |\Delta L_m - V^T R_m| - \varepsilon)^2 \right\},$$

where V is a coefficient vector to be learned, $\Delta L_m$ is a normalized localization error of training sample m, $R_m$ is a feature extracted from all the Regionlets in an object detection model for the m th sample as explained in the following, M is the total number of training examples, C is a trade-off factor between a regularization and the sum of squared error, $\varepsilon$ is a tolerance factor.

2. The detector of claim 1, comprising a feature extractor that extracts features from the image, and a learning module to train the object detector, wherein the learned object detector is applied to each possible locations to detect the object.

3. The detector of claim 1, wherein the object detector makes a b binary decision on whether the location presents an object based on scores provided by the object detector.

4. The detector of claim 1, comprising a location regression module to improve localization of the object.

5. The detector of claim 1, comprising Regionlets having extracted features into a multi-dimensional binary vector and wherein binary vectors obtained from all Regionlets features are concatenated for regression training.

6. The detector of claim 1, comprising a least square learning module to learn the coefficients for location regression based on the binary vector.

7. The detector of claim 1, wherein the object hypotheses are formed through objectness measurement, saliency analysis or their combinations, or segmentation cues.

8. The detector of claim 1, wherein the bottom-up object hypotheses generation unit splits the object location space evenly to avoid the search algorithm converging to the same local minimum.

9. The detector of claim 1, comprising a low-level segmentation unit to propose the object hypotheses.

10. The detector of claim 1, comprising a superpixel segmentation unit to merge similar pixels locally into disjoint sets.

11. The detector of claim 1, wherein over segmented superpixels are gradually merged to produce larger candidates.

12. The detector of claim 1, wherein the detection with location relaxation takes coarse detection results and searches the object location guided by discriminatively learned descent mode.

13. The detector of claim 1, comprising learned supervised descent model is used to predict the next more accurate object location to explore based on observations from the current location.

14. The detector of claim 1, comprising a segmentation based bottom-up module to generate an initial set of candidate searching locations.

15. The detector of claim 1, comprising a module to receive over-segments or superpixels of an image and then hierarchically group these small regions to generate object hypotheses and to generate superpixel segments.

16. The detector of claim 15, wherein a segmented region $r_i$ is described by a plurality of characteristics including size of the region (total number of pixels), color histograms, and texture information or gradient orientation histograms.

17. The detector of claim 16, wherein four neighbor region similarities are defined based on these characteristics as shown in the following equations:

$$S_c(r_i, r_j) = \sum_{k=1}^{n} \min(c_i^k, c_j^k),$$

where $c_i^k$ is the k th dimension of the color histogram, $sz(r_i)$ is the number of pixels in image region $r_i$, im stands for the whole image, $t_i^k$ is the k th dimension of the texture histogram, $bb_{ij}$ is the rectangular region which tightly bound region $r_i$ and $r_j$. $S_c$, $S_s$ and $S_t$ are the color similarity, size similarity, texture similarities, respectively. $S_f$ measures how the combined two regions will occupy the rectangular bounding box which tightly bounds them.

* * * * *